March 15, 1960  E. R. SALZBERG ET AL  2,928,898
TELEPHONE-ANSWERING AND MESSAGE-RECORDING SYSTEM
Filed Nov. 30, 1953  5 Sheets-Sheet 1

INVENTOR.
EMMETT R. SALZBERG
DAVID M. GOODMAN
BY
ATTORNEY

March 15, 1960 E. R. SALZBERG ET AL 2,928,898
TELEPHONE-ANSWERING AND MESSAGE-RECORDING SYSTEM
Filed Nov. 30, 1953 5 Sheets-Sheet 2

| FIGURE 3 | FIGURE 4 | FIGURE 5 |

INVENTOR.
EMMETT R. SALZBERG
DAVID M. GOODMAN
BY
ATTORNEY

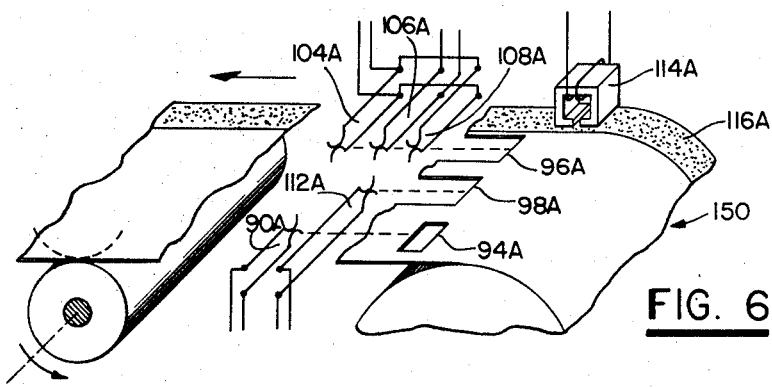
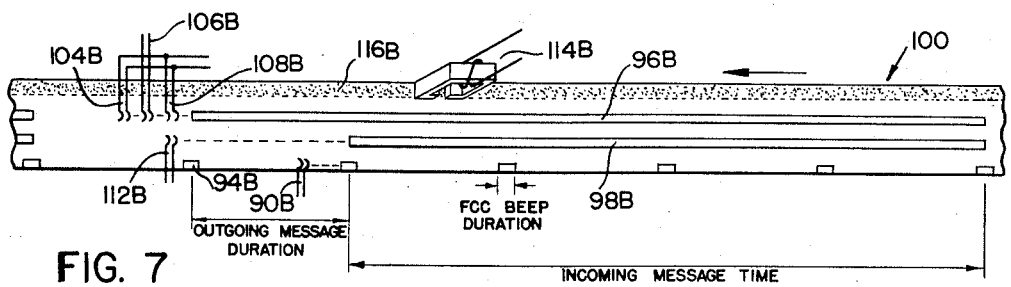
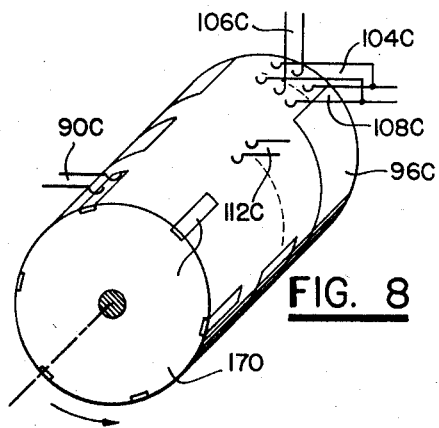
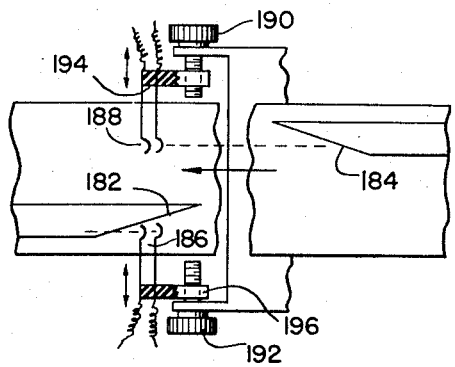
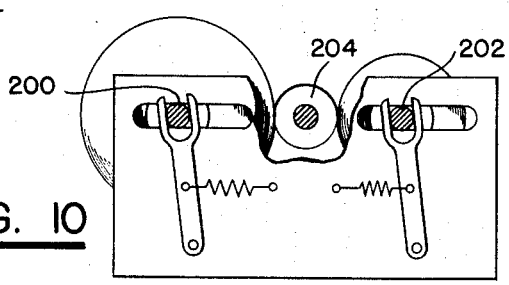

United States Patent Office 2,928,898
Patented Mar. 15, 1960

2,928,898

TELEPHONE-ANSWERING AND MESSAGE-RECORDING SYSTEM

Emmett R. Salzberg, New York, and David M. Goodman, Levittown, N.Y.; said Goodman assignor to said Emmett R. Salzberg, Manhattan, N.Y.

Application November 30, 1953, Serial No. 395,165

17 Claims. (Cl. 179—6)

This invention relates to telephone-answering and message-recording instrumentation. In particular it is directed to a device integrated with the standard telephone. It will, at the discretion of the subscriber, respond to incoming calls, deliver a predetermined message to the caller, instruct the caller how to deliver a message which will be recorded by the instrument, which messages can be listened to later by the subscriber.

Devices intended to perform one or more of these functions have been heretofore proposed. Such earlier devices lacked the basic conception of this invention having as its fundamental principle the integration of the answering and message-recording instrumentation with the circuits and apparatus of the telephone served therewith. The prior devices generally were physically separated from the telephone which they were set to serve; and often used mechanical rather than electrical means of operation. Accordingly, they were large, complex, delicate and expensive to manufacture. The resulting service problems, high price and unwieldiness retarded their acceptance in practical daily use to any substantial extent.

Accordingly, it is one of the fundamental objects of this invention to provide all these functions in a practical, simple-to-operate, inexpensive manner with a single integrated instrument which can be operated easily by the subscriber.

In its fundamental aspects, the objectives of this invention are achieved by a combination of circuits and mechanical means that are integrated with the circuits and mechanism of the telephone. The invention utilizes the "mouthpiece" and the "earpiece" of the telephone in the performance of its functions. The invention may be generally described as follows:

Suitable means are provided for the storage and controlled reproduction of both the subscriber's announcement (outgoing message) and the storage and controlled reproduction of incoming messages. The outgoing messages are recorded on a relatively short storage medium, such as a loop of recording "tape," whereas the incoming messages are recorded on a longer medium, such as a finite length of tape. Both of these storage media are driven by one means, such as a motor which controls, and in turn is controlled by, a timing and switching mechanism.

The switching mechanism also controls the direction of transmission and mode of operation of multi-purpose amplifiers.

These multi-purpose amplifiers function in:

(a) Impressing the subscriber's announcement (intelligence) on the storage loop;

(b) Repeating the subscriber's outgoing message to him for verification;

(c) Repeating that announcement to each caller;

(d) Recording each incoming call (intelligence);

(e) Reproducing for the subscriber the received intelligence;

(f) Supplying tone signals or "beeps";

(g) Erasing the intelligence stored on the loop;

(h) Erasing the intelligence stored on the tape.

The timing mechanism which is integrated with the motor, the loop, the tape and the switching system performs the following functions:

(a) Provides a predetermined interval until the device begins to run through an operating cycle of (1) "announcements" and (2) those operations which follow;

(b) Connects a current line to a relay which performs the electrical equivalent of lifting or depressing the telephone receiver or the handset;

(c) Controls the delivery of the subscriber's announcement;

(d) Controls the interval between, and the duration of, the signal "beeps";

(e) Controls the time allocated for the subscriber's announcement and for the reception of incoming calls;

(f) Causes the device to operate as an unanswered telephone when the recordable portion of the intelligence storage means for the reception of incoming calls has reached the recordable limit;

(g) Resets the device when current is restored in the event of a current failure;

(h) Signals, by means of "beeps," when to begin and end the recording of a desired announcement;

(i) Signals, by means of "beeps" that the caller's message is being recorded in accordance with FCC regulations;

(j) Enables the subscriber to "play back" is announcement for verification.

The manually operated circuit-controlling means performs the following functions:

(a) Connects current to the amplifiers, the motor and the relay;

(b) Reverses the direction of the motor and causes it to run at high speed with an audible hum while rewinding;

(c) Performs the electrical equivalent of maintaining the telephone receiver or the handset depressed;

(d) Supplies "bias" current to the mouthpiece of the telephone;

(e) Connects the ringing circuit of the telephone so that incoming calls will be signalled at all times;

(f) Causes the tape to run at regular speed forward during the play back of received calls;

(g) Reverses the direction of transmission through an amplifier so that intelligence stored on the tape is transmitted to the earpiece of the telephone;

(h) Reverses the direction of transmission through an amplifier so that the subscriber's announcement spoken into the mouthpiece is transmitted to the loop;

(i) Causes an amplifier to oscillate at an erasing frequency, and controls the direction of transmission thereof to provide, as required: erasure of the loop, or erasure of the tape;

(j) Switches the direction and the output of the amplifiers to provide for simultaneous erasure of a recorded announcement and the storage of a new announcement;

(k) Provides additional "side-tone" so that the subscriber may hear the "beeps" that define the interval allocated for the recording of an announcement;

(l) Allows for monitoring incoming calls;

(m) Allows the subscriber, during the course of an incoming call, if he desires, to pick up and converse with the caller.

Further objects and advantages will become more apparent from the following detailed description of this invention as taken in connection with the accompanying drawings in which.

Figures 2, 3:
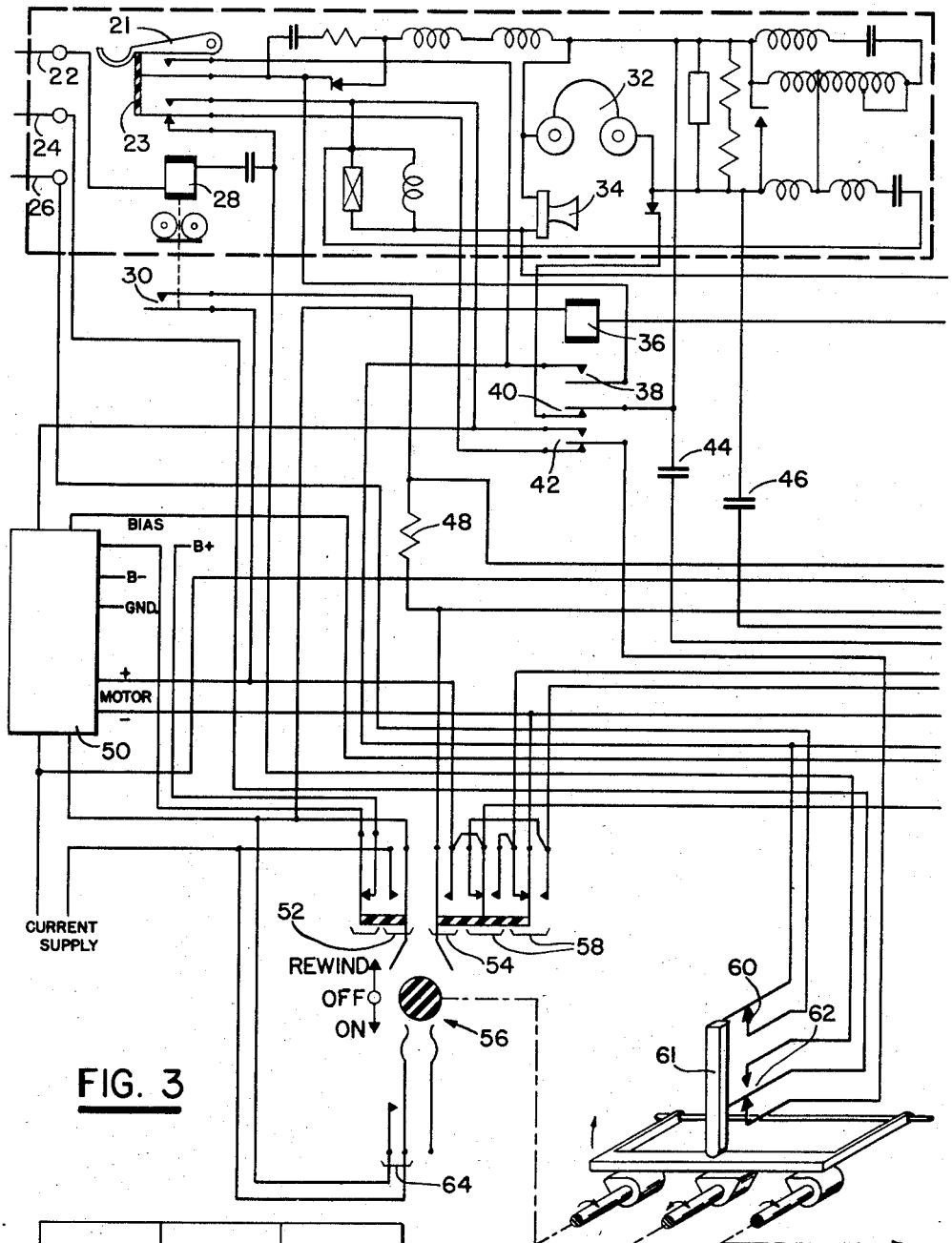
Fig. 2 is a diagrammatic illustration of the relationship of subsequent Figs. 3, 4 and 5.
Figure 4:
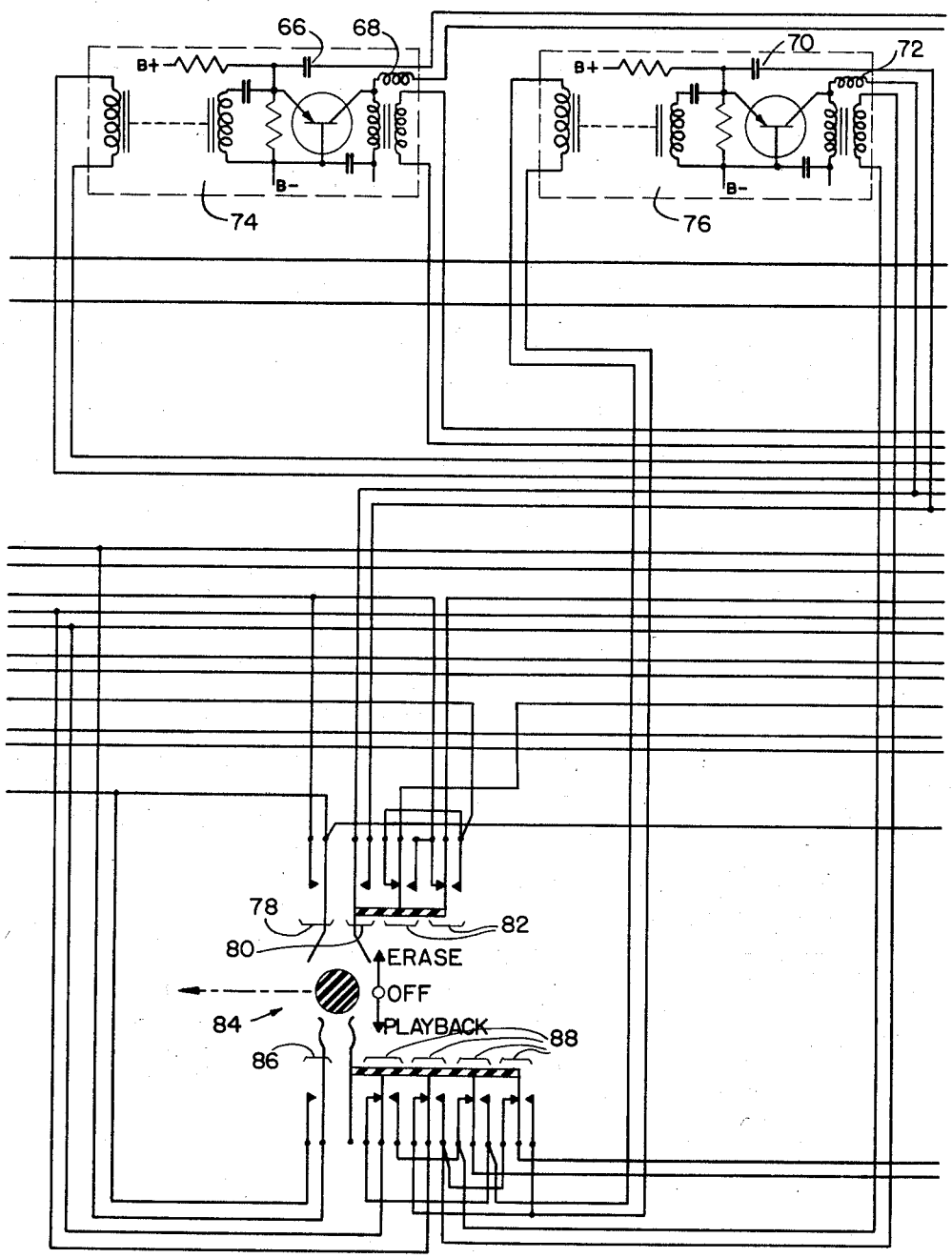
Figure 5:
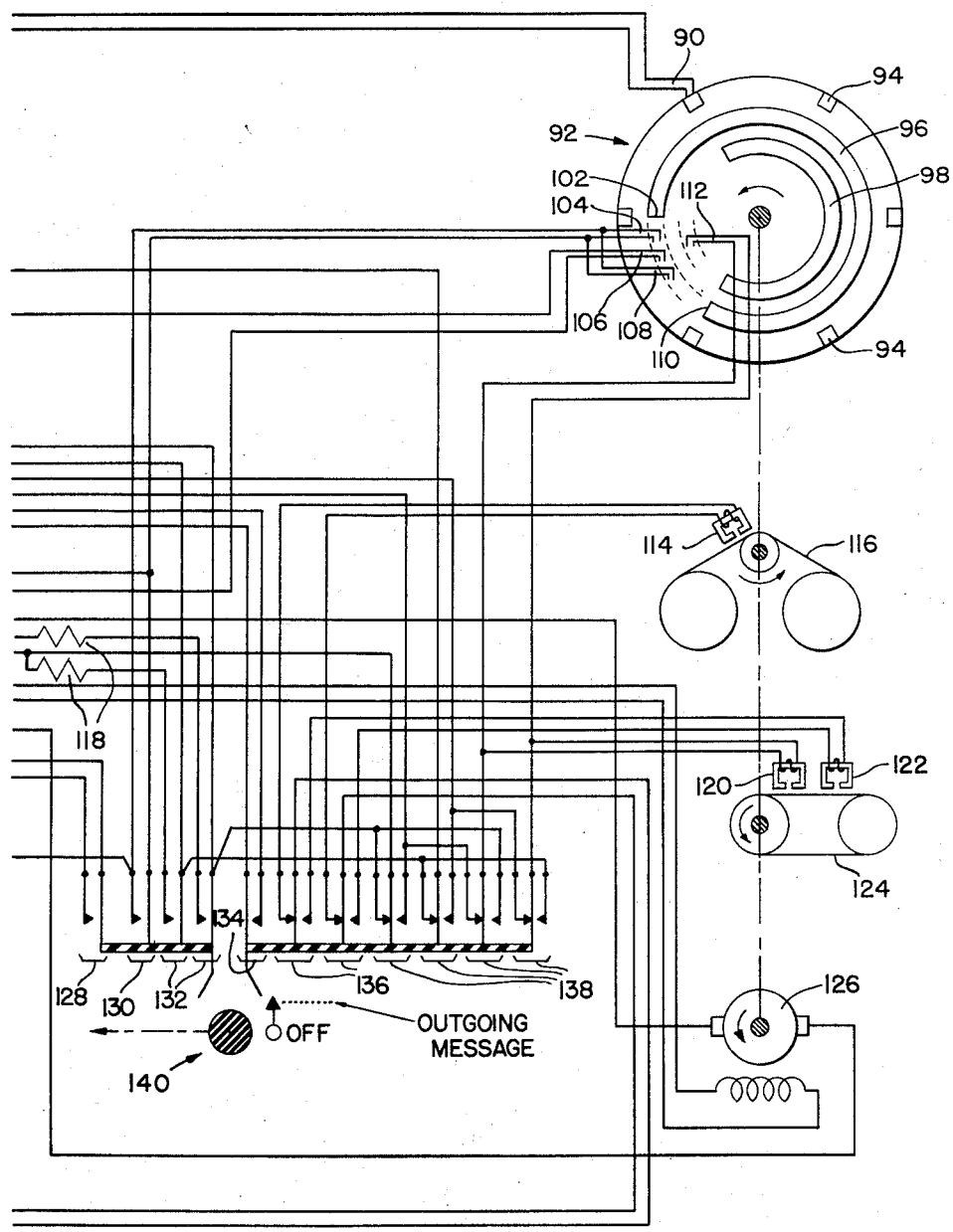

Figs. 3, 4 and 5 constitute collectively a schematic illustration of an embodiment of this invention.

Fig. 6 is a diagrammatic illustration of a finite tape for recording intelligence, and which also embodies means for controlling timing sequences.

Fig. 7 is a diagrammatic illustration of another embodiment of an intelligence storage tape that also provides control of timing sequences.

Fig. 8 is a diagrammatic illustration of another means for timing and controlling the operation of the instrument, when used with tapes that provide only for storage of intelligence.

Fig. 9 is a diagrammatic illustration of means for varying the effective length of time and/or controlling means, in the form of conductive portions, on tape.

Fig. 10 is a diagrammatic representation of means for maintaining movement of the finite tape at uniform speed.

Figure 1:
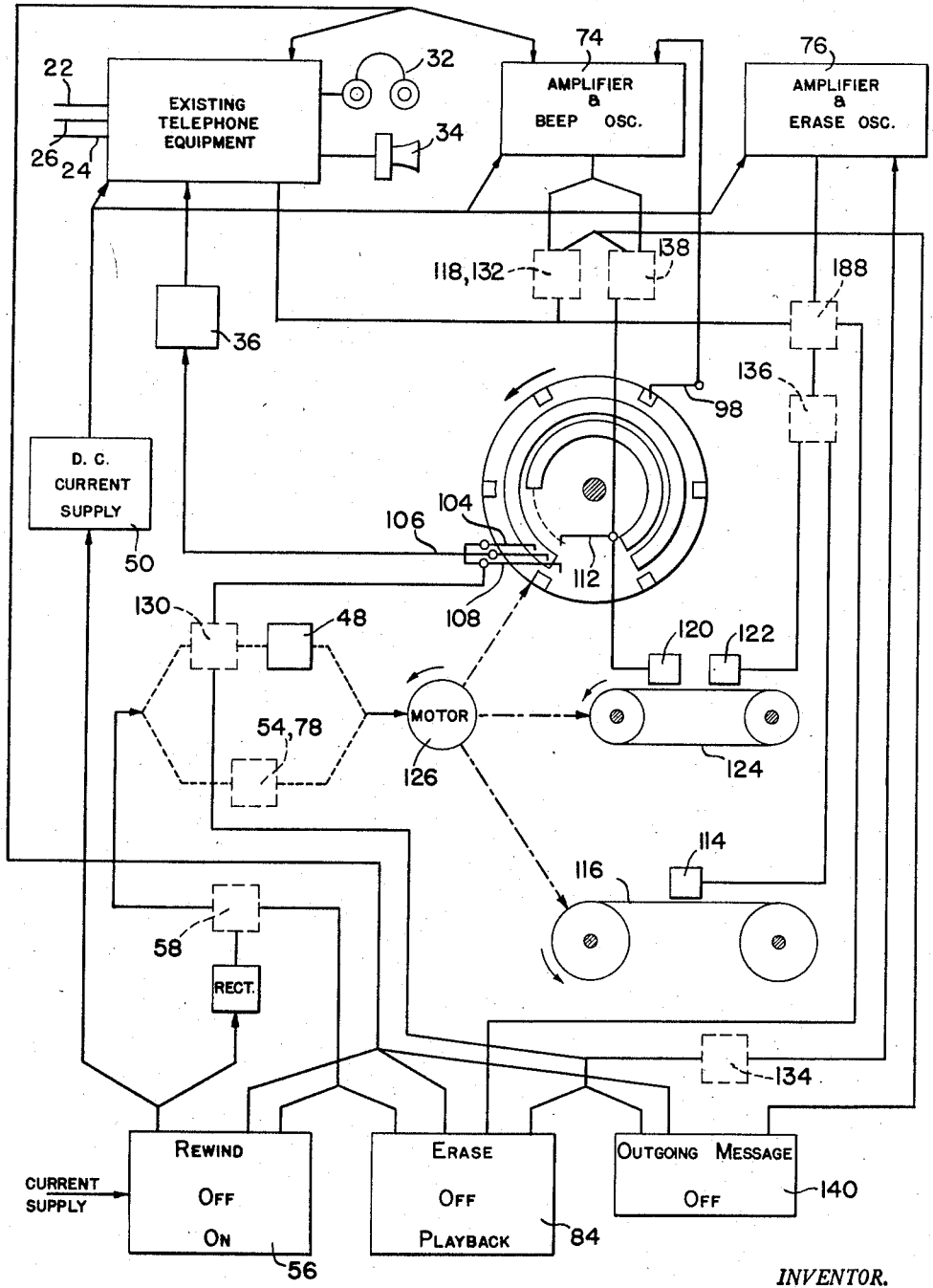
Fig. 1 is a block diagram illustrating an embodiment of the invention.

Referring to the block diagram in Fig. 1 taken in conjunction with the details of the circuitry shown collectively in Figs. 3, 4 and 5, the general sequence of operation will now be set forth as follows:

To set the device in operation the subscriber throws circuit-controlling means 56 to the "on" position. To record an outgoing message, i.e., an announcement or salutation, the subscriber actuates circuit controlling means 140. Means 140 is self-recoverable, as for example by spring loading, and returns to the "off" position when pressure thereon is removed. The time allocated for the announcement is indicated by signals, as for example "beeps." The first "beep" indicates the start of the allocated time and the second indicates the end thereof. To check the announcement thus recorded means for listening to the same are provided by actuating means 84. If the subscriber desires to make a change in his recorded message, another one may be recorded in place thereof by reperforming the outgoing message recording sequence just described.

If the subscriber wishes to leave the device unattended, circuit-controlling means 56 is thrown to the "rewind" position until the rewinding is completed and switch actuating means 56 is left in the "on" position.

When a call comes in, and after a predetermined ringing period, the device is locked into operation, the caller is connected with the instrument as if the handset had been lifted, and he hears the recorded announcement. If the caller desires to leave a message he does so by speaking into his own telephone in the normal manner.

When the subscriber desires to listen to messages received and recorded by this device, circuit-controlling means 56 is thrown to the "rewind" position until the signal, as for example the hum of the motor 126 stops indicating that the tape is fully rewound. Means 56 returns to its normal position, as for example by spring loading, when released. The subscriber then moves means 84 to the "play back" position and listens to the recorded messages through the ear-piece of the telephone.

As hereinafter explained the device provides for answering a predetermined number of incoming telephone calls after which it operates as a normal unanswered telephone.

The telephone always rings audibly in the normal manner whether the device is in use or not; and the telephone may be used as a normal telephoen at any time by placing means 56 in the "off" position.

The detailed sequence of operations is:

When the subscriber proceeds to record an announcement, switch actuating means 56 having been set to "on" and after having been fully rewound, he operates circuit-controlling means 140. This actuation operates circuit making means 128, 130, 132, 134, 136 and 138 and also 60 and 62. Switch contacts 60 and 62 are operated by any or all circuit actuating means 56, 84 and 140 as shown symbolically in Fig. 3. The results thereof are:

(a) By means of 60 and 62, the handset may be lifted while the telephone lines are left in a condition equivalent to that before the handset was raised;

(b) Circuit-making means 62 also allows incoming calls to "ring" the telephone in the usual manner at any time through telephone lines 22 and 24;

(c) Circuit-making means 128 also supplies "bias" current from amplifier-supply 50 for electrical operation of transmitter 34;

(d) Circuit-making means 130 supplies current from supply 50 through resistor 48, so that motor 126 operates forward at recording speed;

(e) Circuit-making means 134 sets amplifier 76 into oscillations at erasing frequency by means of condenser 70 and inductor 72 which is transmitted through circuit-making means 88 and 136 to transducer 122 which thereupon erases any previously recorded announcement stored on loop 124;

(f) Circuit-making means 132 connects the "beep" output of amplifier 74, reduced in volume by resistors 118, and causes this "beep" signal to be heard in earpiece 32;

(g) Circuit-making means 138 connects mouthpiece 34 to the input of amplifier 74 and transmits the output of amplifier 74 to transducer 120 which impresses subscriber's message on loop 124; simultaneously the "sidetone" on the handset is modified through switch 132 by resistors 118;

(h) On completing the recording of the announcement the subscriber releases circuit-controlling means 140. To check the announcement circuit-controlling means 56 is held in the rewind position until the rewind is completed and is then placed in the "on" position. The subscriber may then check the message through earpiece 32 by placing circuit-controlling means 84 in the "play back" position. The tape is rewound by circuit-controlling means 56 and the device may now be left unattended.

The device is thus made ready for the reception of incoming messages when circuit-controlling means 56 remains, or is set to the "on" position. Contact 64 supplies current to the motor and amplifier supply 50. When a call comes in the following detailed sequence of operations takes place:

(a) The telephone ringing current energizes ringer 28, and closes contacts 30 which closes for the duration of the ring; the contacts 30 may be spring biased for controlling the duration of the pulses.

(b) Motor supply 50 supplies current to motor 126 through contacts 30 thereby moving the loop 124, the finite tape 116, the timer and controller 92, until the controller electrically connects contacts 104 by means of conductive strip 96.

(c) Contacts 104 thus closed, thus maintains the forward motion of motor 126 and of the loop 124, etc., independently of the ringing current and prior to the electrical connection of contacts 106.

(d) Contacts 106 thus closed, supplies current to relay 36 which in turn operates contacts 38, 40 and 42, thus in effect "lifting the handset" or "taking the receiver off the hook," and connecting the incoming caller to the device.

(e) Transducer 120 transduces the intelligence recorded on loop 124 and transmits the same through appropriate contacts of switch means 138 to the input of amplifier 74. The output of amplifier 74 goes back through 138, through direct-current blocking condenser 44, and is impressed across the telephone transmitter 34. In this manner intelligence stored on the loop 124 is delivered through the telephone lines 24 and 26 to the caller. After one "cycle" of the announcement, contacts 112 close through the conductive element 98 thereby shorting the output of transducer 120.

(f) Contacts 90 will be connected electrically for the interval determined by the span of conductive element 94. The closing of contacts 90 sets amplifier 74 into oscillations at a frequency controlled by condenser 66 and inductor 68 which generates the "beeps" which during regular operation are transmitted to the transmitter 34 and thence to the lines 24 and 26. These "beeps" notify the caller that his message is being recorded as provided in the regulations of the Federal Communications Commission. The incoming message is received across the earpiece 32 (in the conventional manner) and at the same time is transmitted through blocking condensers 44 and 46, through switch contacts 88, to the input of amplifier 76. The output of amplifier 76 goes back through contacts 88 and through 136, and is recorded on the finite tape 116 by means of transducer 114.

(g) At the end of the time allotted for recording incoming intelligence predetermined by the span of 98, ring segment 96 has been rotated into the position where contacts 106 open, thus de-energizing relay 36, thereby disconnecting the telephone from the line by actuation of switch contacts 38, 40 and 42. The motor 126 continues to rotate carrying controller 92 around for a short distance until contacts 108 are opened. The device has thus completed a cycle and is ready to receive the next incoming call by transducing the subscriber's recorded announcement; and repeating the cycle of operations.

(h) If current should fail during an operating cycle, the caller will be disconnected. When that happens, the telephone operates as a normal unanswered instrument. When current is restored, it is transmitted through contacts 104 and 108 and thence to motor 126 so that the device completes the interrupted cycle.

The duration of the aforementioned "predetermined" ringing period is controlled by the span between the end 110 of segment 96 and the beginning 102 of that segment.

When the subscriber desires to listen to the messages from the outside that had been recorded, he places means 56 in the "rewind" position; and the following detailed sequence of operations takes place:

(a) The holding of 56 in the "rewind" position maintains current through 52 and motor 126 operates at high speed to rewind tape 116 by means of reversing switch 58 and contacts 54 which, by shorting out 48, increases the power to motor 126. Whether any messages have in fact been received may be indicated and counted by various means, as for example the intermittent audible hum of motor 126 during rewind. The telephone will be maintained in the "handset down" position during the rewind by means of circuit-controlling means 60 and 62. Means may be utilized for stopping the motor upon completion of the rewind. Such means may be a combination of a plurality of discs mounted on the controller shaft, each disc being provided with a peripherally disposed lug which, when the desired number of revolutions have elapsed result in the interlocking of each lug with a corresponding member on an adjacent disc so as effectively to stop the motor. The means just described may also be used to lock the instrument at the end of a predetermined number of calls, in such a manner that the device operates as a normal unanswered telephone. When the audible hum stops, the subscriber changes 56 from the "rewind" to the "on" position.

(b) To listen to the recorded incoming messages, means 84 is moved to the "play back" position and the earpiece of the telephone is used for such listening. Positioning means 84 in the "play back" position actuates contacts 60 and 62 which perform the equivalent of leaving the handset down. Circuit-controlling means 62 also allows incoming calls to be signaled by the telephone ringer 28 in the normal manner. Simultaneously, the positioning of means 84 in the "play back" position closes contacts 86 which results in motor 126 running in the forward direction at normal speed.

Transducer 114 transduces the messages stored on tape 116 into electrical energy which is transmitted through contacts 136 and through contacts 88 to the input of amplifier 76. The output of amplifier 76 goes back through contacts 88, through blocking condensers 44 and 46 and is impressed across the earpiece 32. The messages received on tape 116 can be played back by rewinding tape 116 and then repeating the play back. In this way desired portions of a recorded message can be repeated or played back as desired.

To erase the messages recorded on tape 116 circuit-controlling means 84 is placed into, and held in, the "erase" position. Circuit-controlling means 82 and 78 cause the motor 126 to rewind at high speed. Simultaneously, means 80 are closed causing amplifier 76 to oscillate at an erase frequency determined by condenser 70 and inductor 72. The erase output of amplifier 76 goes through circuit-controlling means 88 and 136 into the head of transducer 114 thereby erasing the intelligence. The end of the erase interval is signaled by the cessation of the audible rewinding hum.

Referring to Fig. 6, there is shown a tape and contacts which provide the combination of a tape for recording of intelligence and having thereon means for controlling the various timings hereinbefore described. The tape 150 has a recording section 116A. The transducer 114A is akin to 114. The tape is provided with three sets of slots. Slot 96A, in combination with contacts 104A, 106A and 108A (akin to corresponding contacts 104, 106 and 108) provide the timing that those corresponding members furnish. Slot 98A in combination with 112A (akin to 112) and slot 94A in combination with 90A (akin to 90) provide the timing furnished by the aforesaid corresponding members.

Fig. 7 illustrates another embodiment of a tape which functions in a manner analogous to that of the tape shown in Fig. 6 except that the timing is provided by means of surface conductive contact strips rather than the slots. The conductive strips 94B, 96B and 98B in combination with the respective contacts 104B, 106B and 108B (akin to 104, 106 and 108), 112B (akin to 112) and 90B (akin to 90), respectively, provide the timing means furnished by the aforesaid corresponding parts.

When a tape is used that provides the timing means shown in Fig. 6, a short section of tape is left unperforated at each end to assure that all contacts are left disposed in open condition. Similarly, when a tape is used that provides the timing means shown in Fig. 7, a short non-conducting section is left at each end to provide the corresponding assurance that all contacts are left open.

In Fig. 8 there is shown a rotating drum 170 having thereon conductive strips which are akin to the conductive strips on the disc 92. The contacts 104C, 106C, 108C, 112C and 90C, respectively akin to 104, 106, 108, 112 and 90, provide the timing sequence of those corresponding parts.

Fig. 9 shows how the effective length of a conductive strip on a tape, such as that illustrated in Fig. 7, may be varied. The ends of such strips, as at 182 and 184, are disposed angularly. The contacts 186 and 188 are mounted so as to move transversely of the tape. By adustment of screws 190 and 192, the arms 194 and 196 are moved across the tape so that they engage with, or become disengaged from, the conductive strips at varying longitudinal positions on the tape.

Fig. 10 shows means for moving the finite tape at uniform linear speed. Thus, one end of the tape is fastened to free-turning hub 200 and wound thereon. The other end of the tape is then connected to the hub 202. Intermediate these hubs there is positioned the capstan 204 that revolves at constant speed. Hubs 200 and 202 are spring loaded toward the capstan, the shaft of which is driven by appropriate means. The rotation of the capstan at a constant speed transfers the tape from hub 200 to hub 202 or vice versa at uniform speed.

If desired, in order to reduce the electrical circuitry, mechanical means, as for example linkage, may be provided between post 61 and bar 23 to eliminate 60 and 62. The positioning of bar 23 is controlled by cradle arm 21.

In lieu of the magnetic recording tape shown as the intelligence storing and reproducing means, other means, as for example wire, may be used. Also, in lieu of either of those electromagnetic means for recording intelligence, there may be used electrostatic means.

The telephone-answering and message-recording system of this invention may be connected with appropriate devices akin to those used in telephone exchanges for the purpose of counting or otherwise measuring the calls made by subscribers. The telephone company may also furnish the bias current supplied through contacts 128 while the subscriber records his outgoing announcement. A means for supplying such bias current may be arranged by providing a particular dialing number which the subscriber must dial in order to be supplied with this current.

It will be understood that the foregoing description of the invention and the embodiments set forth are merely illustrative of the principles thereof; and, accordingly, that the appended claims are to be construed as defining the invention within the full spirit and scope thereof.

We claim:

1. In a device that delivers an announcement in response to ringing current or the like on a telephone line, a timer comprising a member driveable by a motor, means on said driveable member to progressively close in sequence, a first circuit, a second circuit and a third circuit, the first and third circuits controlling means to energize said motor, the second circuit controlling means to energise a relay, the said relay closing and opening circuits connecting the device with the telephone line.

2. In a device that delivers an announcement in response to ringing current or the like on a telephone line, a timer comprising a member driveable by a motor, a motor, means on said driveable member to progressively close in sequence, a first circuit, a second circuit and a third circuit, the first and third circuits controlling means to energize said motor, the second circuit controlling means to energize a relay, including means on said member to close an additional circuit which controls delivery of a tone warning signal, a relay, said relay closing and opening circuits connecting the device with the telephone line.

3. In a device that delivers an announcement in response to ringing current or the like on a telephone line, a timer comprising a member driveable by a motor, means on said driveable member to progressively close in sequence, a first circuit, a second circuit and a third circuit, the first and third circuits controlling means to energize said motor, the second circuit controlling means to energize a relay, including means on said member to close an additional circuit which controls delivery of an announcement to a caller, the said relay closing and opening circuits connecting the device with the telephone line.

4. In a device that delivers an announcement in response to ringing current or the like on a telephone line, a timer comprising a member driveable by a motor, means on said driveable member to progressively close in sequence, a first circuit, a second circuit and a third circuit, the first and third circuits controlling means to energize said motor, the second circuit controlling means to energize a relay, the means on said member for closing the circuits having a leading and trailing portion, the distance between said leading and trailing portion being greater than the distance traversed by said means in closing said first, second and third circuits, the said relay closing and opening circuits connecting the device with the telephone line.

5. In a device that delivers an announcement in response to ringing current or the like on a telephone line wherein an electric motor provides the driving power for movable components, timing means comprising a first pair of contacts, a second pair of contacts, said pairs being connected to a line that controls a source of current for the motor, a third pair of contacts disposed intermediately of the aforesaid first and second pairs of contacts and a movable member for progressively closing said first pair, intermediate pair and third pair of contacts.

6. In a device that delivers an announcement in response to ringing current or the like on a telephone line and can record messages from said telephone line, a first erasable and reusable medium for storage of an answer to be delivered in response to an incoming call, means for continuously driving said medium for a plurality of cycles during an operating interval consisting of the answering and message recording periods allocated for answering an incoming call and recording the incoming message, a second erasable and reusable medium for recording answers to incoming calls, means for continuously driving said second medium during the operating interval aforesaid, and electrical circuit control means for interrupting transmission of intelligence recorded on said first storage medium.

7. A device in accordance with claim 6, wherein the said electrical circuit control means comprises a pair of contacts.

8. A device in accordance with claim 6, including a single motor for driving said first and second media.

9. In a device that delivers an announcement in response to ringing current or the like on a telephone line and can record messages from said telephone line, a first medium of endless construction for storage of an answer to be delivered in response to an incoming call, a transducer to pick up the intelligence stored on said first medium, an amplifier in circuit with said transducer, a second medium for storage of incoming calls, timing means for controlling an electrically driven motor, an electric motor, means fixedly coupled to said motor for driving said first and second media, and means fixedly coupled to said motor for driving the timing means, whereby said media and said timing means are driven simultaneously and continuously during an operating cycle.

10. In a device that delivers an announcement in response to ringing current or the like on a telephone line and can record messages from said telephone line, a first medium of endless construction for storage of an answer to be delivered in response to an incoming call, a transducer to pick up the intelligence stored on said medium, an amplifier in circuit with said transducer, a second medium for storage of incoming calls, an electric motor, and means fixedly coupled to said motor for driving said second medium, timing means for controlling said motor, and controlling the delivery of the answer to an incoming call, means fixedly coupled to said motor for driving said timing means, whereby said second medium and said timing means are driven simultaneously and continuously during an operating cycle.

11. A telephone instrument, connectable electrically to a telephone line, which is responsive to a ringing current or the like for use as a telephone in normal fashion and for use as an automatic answering service and which also records incoming messages comprising: a transmitter for use in sending intelligence over the telephone line and for use in recording an announcement message, a receiver for use in delivering intelligence from the telephone line and from the recorded messages, a first recording medium for storage of the aforesaid announcement which is delivered in response to an incoming call when the instrument is on automatic operation, first means within the instrument for electrically coupling said first recording medium to the transmitter for recording the announcement message, second means for electrically coupling said first recording medium to the telephone line for delivering the recorded announcement message, a second recording medium for reception and storage of messages coming in over said telephone line, third means for electrically coupling said second recording medium to the telephone line for recording the incoming messages, fourth means within the instrument for electrically coupling said second recording medium to the receiver for playing back the recorded incoming messages, a single motor, means for connecting said motor in driving engagement with said first recording medium and said second recording medium, and means to energize said motor upon actuation by the ringing current.

12. An instrument in accordance with claim 11 including at least one transducer positioned adjacent said first recording medium and at least one other transducer positioned adjacent said second recording medium, said transducers being disposed in stationary positions during recording and playback.

13. An instrument in accordance with claim 11 including switch means for electrically coupling said transmitter and said receiver with said telephone line, a relay, and timing means for controlling the sequence of operation when the instrument is automatically answering an incoming call which includes controlling the energization of said reay, said relay being in circuit with said switch means for connecting and disconnecting the instrument with said telephone line.

14. A telephone instrument, connectable electrically to a telephone line, which is responsive to a ringing current or the like for use as a telephone in normal fashion and for use as an automatic answering service comprising: a transmitter for use in sending intelligence over the telephone line and for use in recording an announcement message, a receiver for use in delivering intelligence from the telephone line and for playing back the aforesaid recorded announcement message, switch means for coupling said transmitter and said receiver to said telephone lines, a recording medium for storage of the announcement message which is delivered in response to an incoming call when the instrument is in automatic operation, first means within the instrument for electrically coupling said recording medium to the transmitter for recording the announcement message, second means for electrically coupling said recording medium to the telephone line for delivering the recorded announcement message, third means within the instrument for electrically coupling said recording medium to the receiver for playing back the recorded announcement message, a single motor, driveable timing means, means for connecting said motor in driving engagement with said recording medium and said timing means, and means to energize said motor upon actuation by the ringing current.

15. An instrument in accordance with claim 14 including a relay, the energization of which is controlled by said driveable timing means, in circuit with said switch means for connecting and disconnecting the instrument with said telephone line.

16. In a device that delivers an announcement in response to ringing current or the like on a telephone line and records messages from said telephone line, a first medium for storage of an answer to be delivered in response to an incoming call, a second medium for storage of incoming calls, first means for reproducing the stored answer from said first medium, and second means for recording the incoming call on said second medium, said first means having drive means with an operating cycle consisting of reproducing an answer to an incoming call and recording an incoming message, said drive means operating continuously during said cycle.

17. A device in accordance with claim 16 wherein the first medium is of endless construction.

References Cited in the file of this patent

UNITED STATES PATENTS

| | | |
|---|---|---|
| 1,955,497 | Harvey | Apr. 17, 1934 |
| 2,537,407 | Handschin et al. | Jan. 9, 1951 |
| 2,540,299 | Shoup et al. | Feb. 6, 1951 |
| 2,665,337 | Handschin | Jan. 5, 1954 |
| 2,673,241 | Van Deventer et al. | Mar. 23, 1954 |
| 2,673,242 | Van Deventer | Mar. 23, 1954 |
| 2,709,202 | Handschin | May 24, 1955 |